May 24, 1960 　　J. V. DIMICK　　2,937,448
GUN TELESCOPE MOUNTING
Filed Oct. 28, 1957
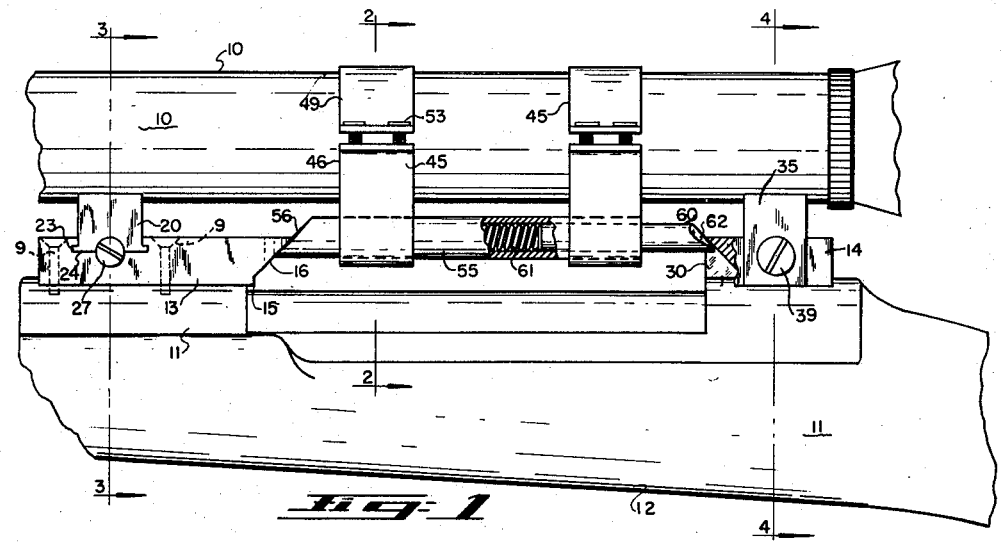
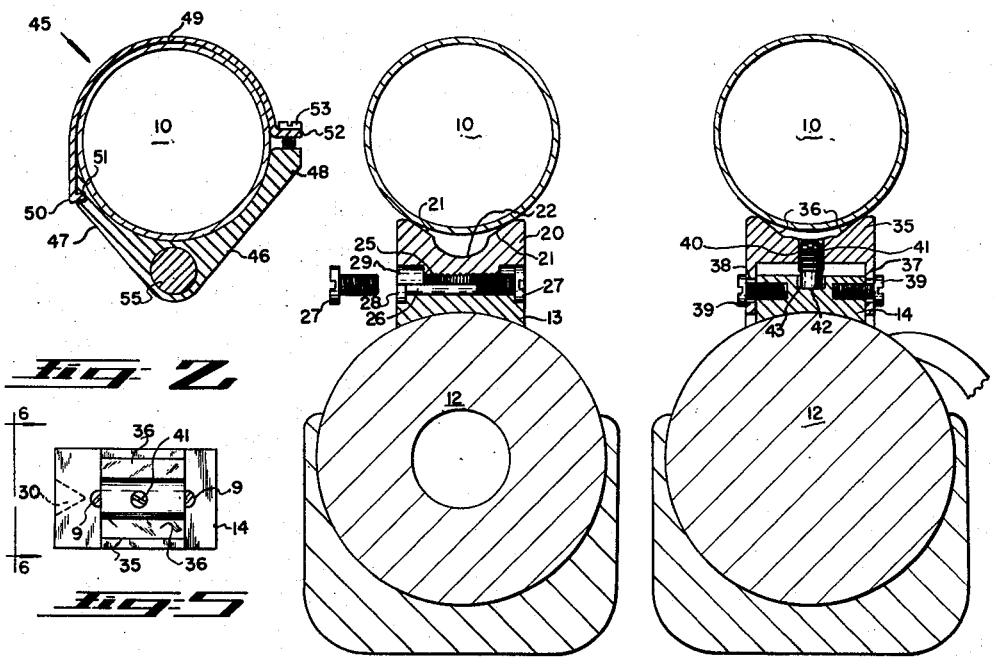
INVENTOR.
JOSEPH V. DIMICK
BY
Cook and Schermerhorn
ATTORNEYS

United States Patent Office 2,937,448
Patented May 24, 1960

2,937,448
GUN TELESCOPE MOUNTING
Joseph V. Dimick, 8535 Columbia Ave., Kennewick, Wash.
Filed Oct. 28, 1957, Ser. No. 692,937
2 Claims. (Cl. 33—50)

This invention relates to an improved mounting for a sighting telescope on a gun, such as a hunting rifle.

The general objects of the invention are to provide a low mounting for the telescope, to avoid cumbersome fittings which remain on the gun when the telescope is removed, to provide telescope mounting brackets which do not interfere with the use of metallic sights, and to provide a mounting which is inexpensive to manufacture and rugged and accurate in use.

More particular objects are to provide an improved mounting wherein the telescope is quickly and easily detachable from the gun in the field without the use of tools, to provide a mounting incorporating windage and elevation adjustments so that the same telescope may be used interchangeably on a plurality of guns without altering said adjustments each time the telescope is transferred from one gun to another, and to provide an improved form of telescope seating members which will not dent the telescope tube.

The invention will be better understood and additional objects and advantages will become apparent from the following detailed description of a preferred embodiment illustrated on the accompanying drawing. The drawing is not intended to limit the invention, however, as various changes in construction and arrangement of parts will occur to persons skilled in the art and all such modifications within the scope of the appended claims are included in the invention.

In the drawing:

Figure 1 is a fragmentary side elevation view of the left side of a typical hunting rifle illustrating the telescope mounting of the invention;

Figure 2 is a cross sectional view taken on the line 2—2 of Figure 1;

Figure 3 is a cross sectional view taken on the line 3—3 of Figure 1;

Figure 4 is a cross sectional view taken on the line 4—4 of Figure 1;

Figure 5 is a top plan view of the rear telescope mounting bracket;

Figure 6 is an end elevation view of the rear telescope mounting bracket taken on the line 6—6 of Figure 5; and Figure 7 is a fragmentary top plan view of the locking plunger shown in Figure 1.

The telescope 10 is shown mounted on the receiver 11 of rifle 12. A front mounting bracket 13 is secured to the top of the front end of the receiver by a pair of screws 9 and a rear mounting bracket 14 is similarly secured to the top of the rear end of the receiver.

The rear end of front mounting bracket 13 is equipped with a depending lip 15 which overhangs the rear end of the upper edge of the receiver to transmit recoil thrust directly to the mounting bracket 13 so that this stress will not be imposed on the screws 9. Above the lip 15 is a flat sloping surface 16 which is utilized for securing the telescope to the bracket.

Front mounting bracket 13 carries a V-block support 20 having a pair of inclined flat rest surfaces 21 to engage the telescope tube in line contact. Between the rest surfaces 21 the V-block is relieved at 22 to allow the hunter to use the metal sights when the telescope is removed.

V-block 20 is of inverted T-shape having horizontal side flanges 23 slidable in a transverse undercut groove 24 in bracket 13 to provide windage adjustment. Between V-block 20 and bracket 13 there is a transverse screw hole having an upper threaded half 25 in the under side of the V-block and an under smooth half 26 in the bracket. Windage adjustment screws 27 are engaged with the threads 25 from opposite ends of the screw hole. The opposite ends of the screw hole are provided with shallow counterbores or recesses 28 in bracket 13 to receive the screw heads while V-block 20 is provided with deeper recesses 29 for the same purpose. Thus, by tightening one screw and loosening the other, the V-block 20 may be shifted laterally to one side or the other for sighting in the telescope.

Rear mounting bracket 14 is equipped on its forward end with a V-notch 30 having two inclined clamping surfaces 31 which slope forwardly and laterally to engage and center the pointed end of a locking plunger on the telescope presently to be described. Surfaces 31 may be flat or rounded to perform the desired centering function.

Bracket 14 carries a V-block support 35 having a pair of inclined flat rest surfaces 36 to engage the telescope tube in line contact. This V-block is of inverted U-shape having a pair of depending side legs 37 slidable vertically in vertical grooves in the sides of bracket 14 for elevation adjustment. Legs 37 are equipped with vertical slots 38 to receive clamp screws 39 in the bracket. The center of V-block 35 is equipped with a threaded vertical bore 40 for an elevation adjustment screw 41. Screw 41 has a smooth unthreaded lower end portion 42 seating in a smooth bore recess 43 in the bracket 14. After the elevation of V-block 35 is properly adjusted by means of screw 41, the V-block is clamped to the bracket by tightening screws 39.

The telescope tube 10 is mounted in a pair of ring clamps, designated generally by the numeral 45. These ring clamps are of split or divided construction for convenience in mounting a telescope tube having enlarged end fittings which ordinarily have to be removed in order to insert the telescope tube in conventional one-piece ring clamps. Each ring clamp 45 comprises a V-shaped lower member 46 having two divergent upwardly-extending legs 47 and 48 and a semi-circular upper member 49. One end of member 49 is equipped with a hook 50 to engage a notch 51 in leg 47 and the other end is equipped with a flange 52 to receive a screw 53 in leg 48.

The two lower clamp members 46 are rigidly secured at spaced points to a hollow anchor rod 55. The forward end of anchor rod 55 has a flat, or substantially flat, sloping surface 56 corresponding to the inclination of flat surface 16 on the front bracket 13. Projecting from the rear open end of hollow anchor rod 55 is a locking plunger 60 which is extended by a compression spring 61. A retaining stop, not shown, is provided to prevent separation of plunger 60 from rod 55. The extremity of locking plunger 60 is bevelled at 62 to present two sloping faces arranged to interfit with the sloping surfaces 31 of the V-notch 30 in bracket 14. Faces 62 are preferably flat or substantially flat.

By this arrangement, the recoil shock of the gun is not transmitted to spring 61 and the telescope will not be dislodged accidentally by a strong recoil. On the other hand, when it is desired to remove the telescope, all that is necessary is to pull the telescope rearwardly by compressing spring 61 until the front end 56 of the anchor rod 55 is free of the front bracket 13. When the telescope is removed, the metallic sights may be used without removing brackets 13, 14 and V-blocks 20, 35 by sighting through the recess 22 in the front V-block. The brackets and V-blocks remaining on the gun do not present a cumbersome obstruction either in carrying and using the gun or in packing it in a gun case which does not have an enlargement to receive a telescope or its fittings. The brackets 13, 14 and V-blocks 20, 35 may remain permanently on the gun and clamps 45 and anchor rod 55 may remain permanently on the telescope.

With the present type of mounting the hunter may use the same telescope interchangeably on a number of rifles. After each rifle has been sighted in, the telescope may be transferred from one gun to another without affecting the individual windage and elevation adjustments on each gun. In hard usage the broad flat areas of the V-block rest surfaces 21 and 36 prevent denting of the telescope tube which has been found to be an objectionable feature of certain prior mounts having point contact with the telescope tube.

Having now described my invention and in what manner the same may be used, what I claim as new and desire to protect by Letters Patent is:

1. A gun telescope mounting comprising a pair of mounting brackets adapted to be secured to the top of a gun by vertical screws, a telescope tube, a flat sloping undercut end clamping surface on one of said brackets, a transverse groove in the top of said one bracket, a V-block mounted for transverse movement in said groove for windage adjustment, said V-block having a pair of inclined flat seating surfaces for said telescope tube, an undercut V-notch end clamping surface in the other mounting bracket, a V-block support on said other bracket having vertically slotted depending side legs overlapping and slidable vertically along the sides of the bracket, a vertical tapped bore in said last V-block containing a screw engaging said bracket to change the vertical position of said V-block for elevation adjustment, screws in the sides of said other bracket extending through the slots in said legs to clamp said elevation adjustment, said last V-block having a pair of inclined flat seating surfaces for said telescope tube, a resiliently extensible anchor rod clamped on the under side of said telescope tube, a flat sloping surface on one end of said anchor rod engageable with said undercut surface of said first mounting bracket, and an inclined V-surface on the other end of said anchor rod engageable in said V-notch of said second mounting bracket to clamp said telescope tube on said seating surfaces of said V-blocks.

2. A gun telescope mounting comprising a pair of mounting brackets adapted to be secured to the top of a gun by vertical screws, a telescope tube, a flat sloping undercut end clamping surface on one of said brackets, a transverse groove in the top of said one bracket, a V-block mounted for transverse movement in said groove for windage adjustment, said V-block having a pair of inclined flat seating surfaces for said telescope tube, an undercut V-notch end clamping surface in the other mounting bracket, a V-block support on said other bracket having vertically slotted depending side legs overlapping and slidable vertically along the sides of said bracket, a vertical tapped bore in said last V-block containing a screw engaging said bracket to change the vertical position of said V-block for elevation adjustment, screws in the sides of said other bracket extending through the slots in said legs to clamp said elevation adjustment, said last V-block having a pair of inclined flat seating surfaces for said telescope tube, a telescopic spring-extended longitudinal anchor rod, a pair of V-members secured to said anchor rod at longitudinally spaced points intermediate the ends thereof, each of said V-members having a pair of upwardly divergent legs, one leg having a transverse notch and the other leg being equipped with screw holes, semi-circular clamp members clamping said telescope tube to said V-members, each semi-circular member having a hook on one end engaged with said notch in said one leg and a flange on its other end secured by screws in said screw holes in the other leg, a flat sloping surface on one end of said anchor rod engageable with said undercut surface of said first mounting bracket, and an inclined V-surface on the other end of said anchor rod engageable in said V-notch of said second mounting bracket to clamp said telescope tube on said seating surfaces of said V-blocks.

References Cited in the file of this patent
UNITED STATES PATENTS

| | | |
|---|---|---|
| 1,316,482 | Holden et al. | Sept. 16, 1919 |
| 2,237,395 | Sweet | Apr. 8, 1941 |
| 2,452,145 | Pike | Oct. 26, 1948 |
| 2,510,289 | Livermore | June 6, 1950 |
| 2,569,183 | Livermore | Sept. 25, 1951 |
| 2,621,410 | Street | Dec. 16, 1952 |
| 2,739,384 | Chokae | Mar. 27, 1956 |
| 2,803,880 | Weaver | Aug. 27, 1957 |